United States Patent [19]

Hauschild

[11] Patent Number: 5,349,341
[45] Date of Patent: Sep. 20, 1994

[54] QUAD CHANNEL UNIT HEALTH REGISTERS WITH "OR" FUNCTION MEANS

[75] Inventor: Mark E. Hauschild, Parsippany Township, Morris County, N.J.

[73] Assignee: AT&T Bell Laboratories, Murray Hill, N.J.

[21] Appl. No.: 814,948

[22] Filed: Dec. 30, 1991

[51] Int. Cl.[5] .............................................. H04M 3/08
[52] U.S. Cl. .................................. 340/825.03; 379/27
[58] Field of Search ............... 340/825.03; 370/60, 370/56, 71, 110.1, 13, 15; 379/5, 27, 29; 371/20.1, 20.2, 49.1, 49.2; 360/61

[56] References Cited

U.S. PATENT DOCUMENTS

| | | | |
|---|---|---|---|
| 4,167,041 | 9/1979 | Curlander et al. | 364/900 |
| 4,949,355 | 8/1990 | Dyke et al. | 370/13 |
| 5,018,184 | 5/1991 | Abrams et al. | 370/15 |
| 5,046,067 | 9/1991 | Kimbrough | 370/56 |
| 5,075,805 | 12/1991 | Peddle et al. | 360/61 |

Primary Examiner—Donald J. Yusko
Assistant Examiner—John Giust
Attorney, Agent, or Firm—Lester H. Birnbaum

[57] ABSTRACT

Disclosed is a circuit for channel units in a digital loop carrier transmission system. Two registers include information related to the health of the channel units. One of the bits of a first register is the logical "OR" of the last four bits in the second register, thus permitting a reading of a single register to determine if any problems exist.

10 Claims, 3 Drawing Sheets

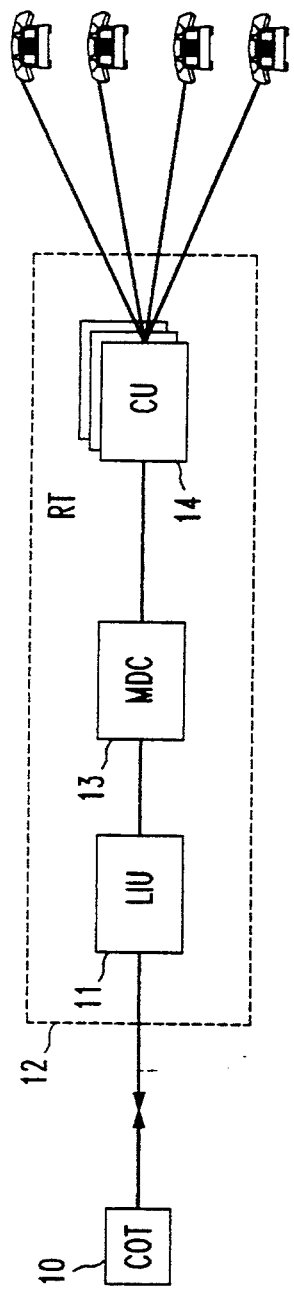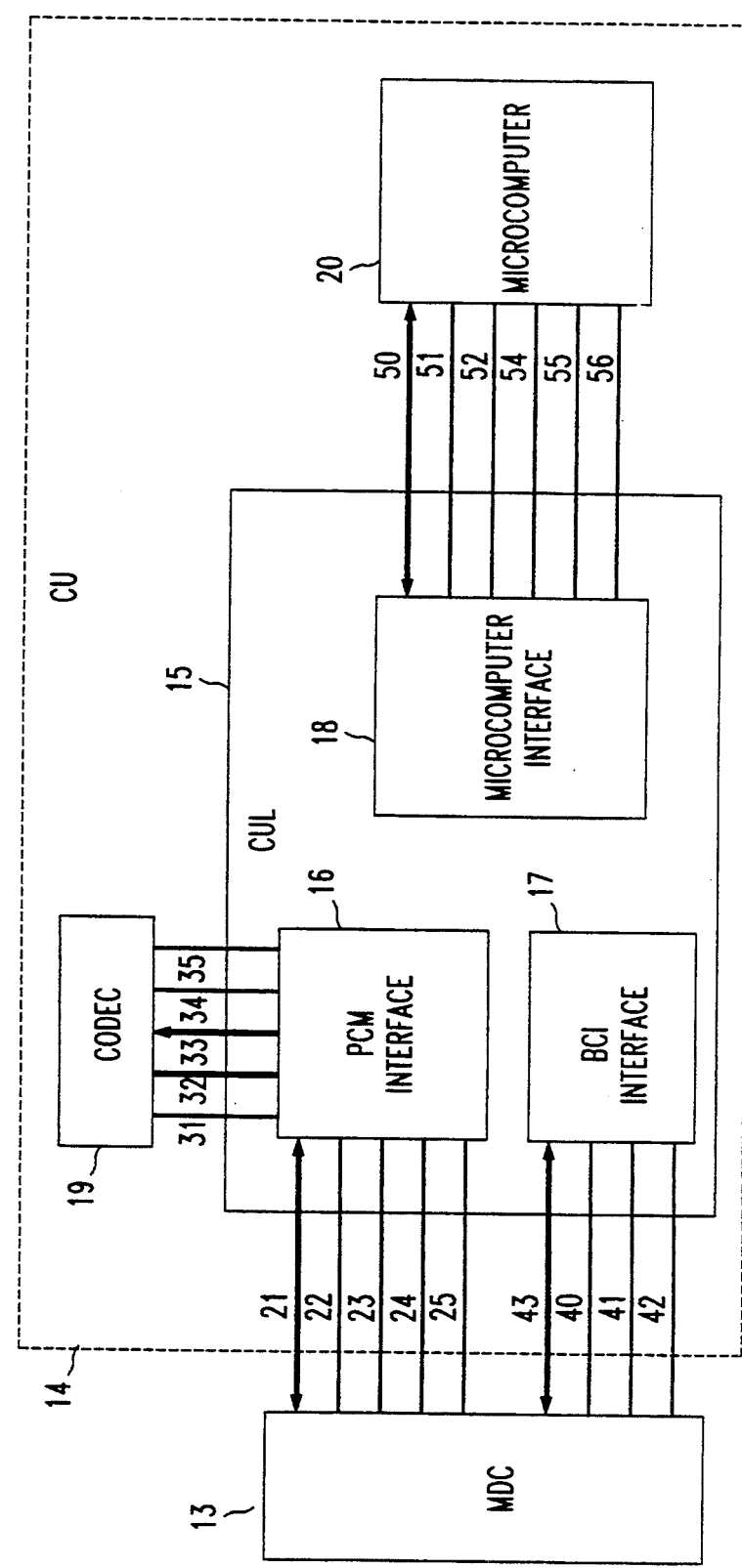
FIG. 1
FIG. 2

FIG. 3

| FIRST HEALTH REGISTER | D7 | D6 | D5 | D4 | D3 | D2 | D1 | D0 |
|---|---|---|---|---|---|---|---|---|
| | TRA | TRB | REA | REB | QFLG | MOI | SB | JPU |

| SECOND HEALTH REGISTER | D7 | D6 | D5 | D4 | D3 | D2 | D1 | D0 |
|---|---|---|---|---|---|---|---|---|
| | TRA | TRB | REA | REB | TRC | TRD | REC | RED |

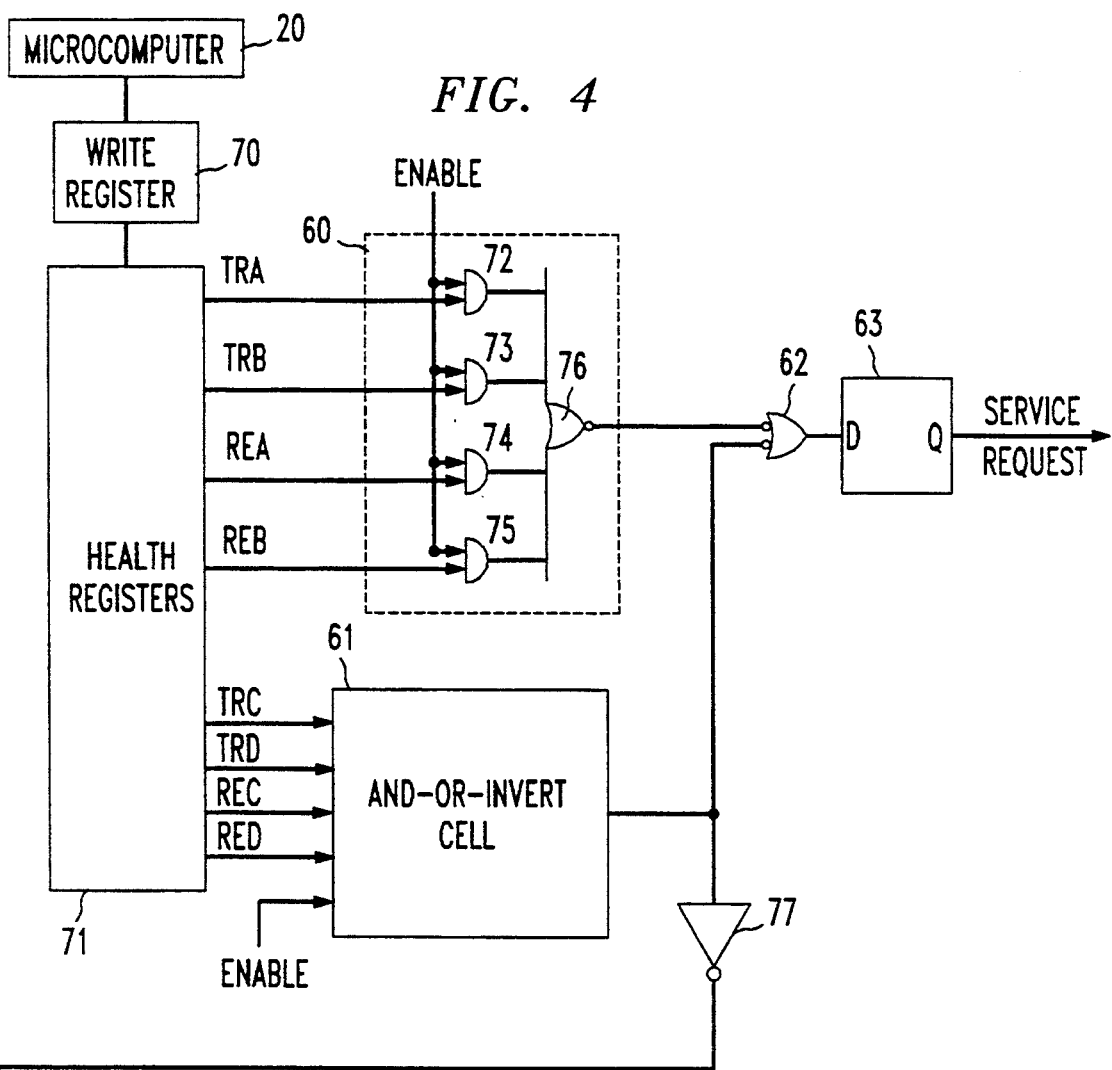
FIG. 4
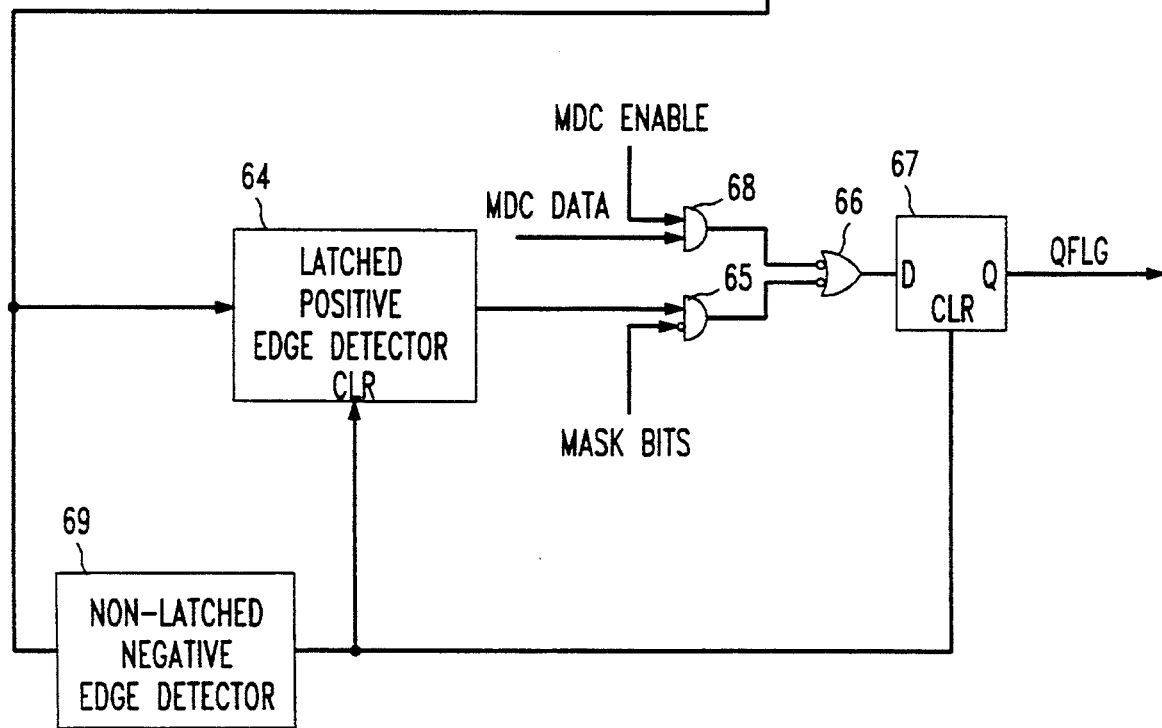

QUAD CHANNEL UNIT HEALTH REGISTERS WITH "OR" FUNCTION MEANS

BACKGROUND OF THE INVENTION

This invention relates to digital loop carrier transmission systems.

In standard digital loop carrier transmission systems, such as the Subscriber Loop Carrier (SLC®) system, each channel unit (CU) interfacing with the customer provides service for two channels. In order to monitor testing and relay problems on the channels, present systems generally include a single 8-bit "health" register which can be read by a bank controller unit (BCU).

In newer systems, each unit will service four channels, as well as provide enhanced services such as inventory and automatic loss control. Such quad channel units should be compatible with existing systems, as well as provide additional information concerning the health of the additional channels. Further, it is desirable to minimize the time needed to address any registers on the units.

SUMMARY OF THE INVENTION

The invention is a channel unit comprising first and second registers adapted to include information related to the functioning of the unit. Means are provided for taking the logical "OR" function of 4-bits in the second register and writing the result into the first register.

BRIEF DESCRIPTION OF THE DRAWING

These and other features of the invention are delineated in detail in the following description. In the drawing:

FIG. 1 a block diagram of a portion of a typical digital loop carrier transmission system;

FIG. 2 is a block diagram of a channel unit in the transmission system which includes circuitry according to the invention;

FIG. 3 is a block diagram of a pair of registers in accordance with the same embodiment; and FIG. 4 is a circuit diagram of a portion of a channel unit in accordance with the same embodiment.

DETAILED DESCRIPTION

FIG. 1 illustrates some of the basic components of a digital loop carrier transmission system. Digital information is transmitted via a bidirectional link between a central office terminal (COT), 10, and a line interface unit (LIU), 11, which is part of a remote terminal (RT), 12. The LIU basically converts the time division frame signals between what is compatible with the COT and with the RT. The LIU is coupled to a metallic distribution controller (MDC), 13, which combines the features of prior art transmit-receive units (TRU) and bank controller units (BCU). That is, the MDC multiplexes or demultiplexes the signals for transmission to the COT or to the channel units (CU), respectively. The MDC also controls the various components of the remote terminal, only some of which are shown here. The MDC is coupled to the channel units (CU), e.g., 14, which provide the interface with the customers. In typical prior art systems, each channel unit would be coupled to two channels (i.e., two subscriber lines). In the new systems, each "quad" channel unit will be coupled to four channels, as illustrated.

FIG. 2 illustrates in more detail some of the components of a typical channel unit, 14. The channel unit includes a channel unit logic (CUL) chip, 15, which comprises three interface circuits shown as boxes labelled PCM interface, 16, BCI interface, 17, and microcomputer interface 18. As the names imply, the PCM interface, 16, provides an interface for the PCM data signals transmitted between the channel unit and the MDC 13. It also provides an interface with the Codec, 19, which is pan of the channel unit. The BCI interface, 17, provides the interface for signals transmitted between the channel units and the MDC which are related to the maintenance and control of the unit. It will be appreciated, therefore, that the PCM interface couples to the transmit-receive functions of the MDC and the BCI interface couples to the bank controller unit functions of the MDC. The microcomputer interface, 18, provides the interface between the channel unit logic chip and the microcomputer, 20, which is also located on the channel unit.

In some more detail, data between the PCM interface and MDC is transmitted via the data bus 21. Polling leads 22–25 determine which channel unit will be addressed by the MDC. Data between the PCM interface and the Codec is carried by data busses 32 and 33. A clock signal is sent over lead 31. Leads 34 and 35 provide synchronization signals for the transmitted and received data, respectively. The BCI interface is coupled to the MDC by an enable lead, 40, and a clock lead, 41, which together select the particular channel unit. A service request lead, 42, is utilized when the channel unit requires the attention of the MDC. Data is transmitted and received on the data bus 43. Data between the microcomputer interface and the microcomputer is transmitted on bus 50. A test lead 51 provides for testing of counters (not shown) in the microcomputer interface. An enable lead, 52, serves to reset an address counter (not shown) in the microcomputer interface so that the registers in the interface can be sequentially addressed. A serial clock signal from the microcomputer appears on line 54 in order to drive the interface, while a buffered clock signal is transmitted by the interface on lead 55 in order to allow the microcomputer to communicate with the Codec 19. A reset function is provided on line 56.

Of particular interest in the context of the present invention is the BCI interface which includes a plurality of registers. Two of these registers are illustrated in block form in FIG. 3. Each register includes 8-bits which are designated $D_7$–$D_0$. The type of bit in each position of the register is indicated by abbreviations which will be explained below. The registers are designated First Health and Second Health registers since they primarily provide information which requires service from the MDC.

The TRA bit which appears at the $D_7$ position in both registers indicates that the channel unit has received a request from outside the remote terminal to test channel "A". Thus, this bit alerts the MDC that a test procedure should be set up for that channel. Similarly, TRB, TRC and TRD indicate a request to test channels "B", "C" and "D", respectively. TRB appears at $D_6$ in both registers, while TRC appears at $D_3$ of the second register and TRD appears at $D_2$ of the second register.

The REA bit indicates that a relay on the channel unit coupling channel "A" has become stuck. This bit appears at $D_5$ of both registers. Similarly, REB, REC and RED indicate stuck relays for channels "B", "C" and "D", respectively. REB appears at $D_4$ in both registers, while REC appears at $D_1$ of the second register and RED appears at $D_0$ of the second register.

The MOI bit appearing at $D_2$ of the first register is part of the handshake routine between the MDC and channel unit, and indicates a service request by the channel unit to the MDC. SB is a safety bit which must be set before certain other service-affecting bits in other registers in the channel unit can be set. The JPU bit appearing at $D_0$ in the first register indicates a just powered up state to notify the MDC that a channel unit has been installed.

In accordance with a feature of the invention, the first register includes a bit designated QFLG. This bit is the logical "OR" of the last 4-bits of the second register (TRC, TRD, REC and RED). That is, QFLG will be a "1" if any one or more of the last 4-bits in the second register is also a "1". This feature allows the MDC to read only the first register to determine if service is needed by a particular channel unit. Only if QFLG is set to "1" does it become necessary for the MDC to also read the second register to determine the precise nature of the service required.

FIG. 4 is a circuit diagram of a basic circuit which may be utilized for producing the QFLG bit and for providing a service request from the BCI interface to the MDC (on lead 42 of FIG. 2). The microcomputer, 20, writes bits into a write register, 70, which is located in the microcomputer interface (18 of FIG. 2). This register is coupled to the health registers 71, which are also illustrated in FIG. 3, so that whenever a bit is set in the write register, it is also set in the health registers. Each of the bits, TRA, TRB, REA or REB is coupled to an associated AND gate, 72-75 along with an ENABLE signal from the microcomputer, 20, through another write register (not shown) at the microcomputer interface (18 of FIG. 2). Assuming the ENABLE signal is a "1", if any of the bits are set equal to 1, then NOR gate 76 will produce a zero at its output. The combination of AND gates 72-75 and NOR gate 76 is commonly referred to as an AND-OR-INVERT cell and is given the designation 60. Similarly, if any of the bits, TRC, TRD, REC or RED, are set, a "0" will appear at the output of AND-OR-INVERT cell 61.

The outputs of the cells, 60 and 61, are inverted and coupled to an "OR" gate, 62, whose output is coupled to the D input of a standard flip-flop circuit 63. Thus, if a "1" appears at the FF input as a result of a "0" from either cell, 60 or 61, a "1" will appear at the Q (output) lead of the flip-flop and a service request is thereby generated.

The output of the cell, 61, is also coupled by means of inverter 77 to the input of a latched positive edge detector, 64, which will produce a "1" at its output if any of the bits, TRC, TRD, REC or RED, go from inactive to active (from 0→1). Since the detector, 64, is latched, the output will remain a "1" even if the triggering bit returns to "0". The output of the detector, 64, is coupled to one input of an AND gate 65. Inverted masking bits are coupled to the other input of the AND gate 65. Thus, if it is desired to mask a change in one or more of the bits, TRC, TRD, REC or RED, a "0" will be produced at the output of the AND gate 65. (For a discussion of mask bits in digital loop carrier transmission systems, see, e.g., U.S. Patent Application of M. Hauschild Case 2, filed on an even date herewith.)

Assuming that no masking bits are applied to the AND gate, a "1" at the output of the edge detector will produce a "1" at the output of the AND gate 65. This output is coupled to one of the inputs of an OR gate 66. A "1" at the output of gate 65 will produce a "1" at the output of the OR gate 66 which is applied to the D input of a flip-flop circuit 67. This input will produce a "1" at the Q lead (output) of the flip-flop which constitutes the QFLG bit of the First Health register.

It is desirable to have the MDC itself write a QFLG bit into the register in order to be compatible with existing systems. Thus, an enable line and data line from the MDC are coupled to AND gate 68, whose output is coupled to the OR gate 66. Thus, either a change in TRC, TRD, REC, RED or a message from the MDC will set the QFLG bit at the output of the flip-flop 67.

In order to reset the flip-flop, the output of the cell, 61, is also sent to a non-latched negative edge detector, 69. A pulse will be produced at the output of the detector when all of the bits, TRC, TRD, REC, and RED, which were active return to an inactive state (goes from 1→0). The output of the detector 69 is coupled to the CLR input of the flip-flop 67 in order to override the input at the D terminal and thereby produce a "0" at the Q terminal.

It will be noted in the circuit of FIG. 4, that a service request is generated by a change in the bits themselves and not by the QFLG bit. Thus, the service request will be retired and the QFLG bit automatically reset when the event that set one of the bits is cleared. There is no need to separately clear the QFLG bit. Also, if the QFLG bit is set by the MDC, and all bits are inactive, no service request is generated. Further, the MDC cannot interfere with proper clearing of the QFLG bit when any of the bits, TRC, TRD, REC, or RED, are active since the latched positive edge detector, 64, will remain in a triggered condition until a pulse is supplied thereto from the output of the negative edge detector. The only way for the MDC to clear QFLG is to apply masking bits to the input of the AND gate 65.

Various modifications of the invention will become apparent to those skilled in the art. All such variations which basically rely on the teachings through which the invention has advanced the art are properly considered within the scope of the invention.

I claim:

1. A channel unit for providing service to four channels in a digital loop carrier transmission system comprising:
   a first register a portion of which is adapted to include bits of information related exclusively to a first and second channel;
   a second register a portion of which is adapted to include bits of information related exclusively to a third and fourth channel; and
   means for taking a logical OR function of the plurality of bits in the second register related exclusively to the third and fourth channel and writing the result into another portion of the first register.

2. The channel unit according to claim 1 wherein the plurality of bits consists essentially of four bits providing information related to the third and fourth channels.

3. The channel unit according to claim 2 wherein the four bits indicate the presence of test requests for the third and fourth channels and stuck relays on the third and fourth channels.

4. The device according to claim 1 wherein the means for taking a logical OR function comprises an AND-OR-INVERT cell and the means for writing comprises an edge detector coupled to the output of the cell, the output of the edge detector being coupled to a flip-flop circuit.

5. The device according to claim 4 wherein the edge detector comprises a latched positive edge detector.

6. The device according to claim 5 further comprising means for clearing the flip-flop circuit comprising a non-latched negative edge detector.

7. The device according to claim 4 further comprising a second flip-flop coupled to the output of the cell for generating a service request from the channel unit.

8. The device according to claim 4 further comprising means coupled to the flip-flop through an OR gate to permit a metallic distribution controller to write into the first register.

9. The device according to claim 4 wherein the output of the edge detector is coupled to one input of an AND gate, while another input of the AND gate is adapted to receive inverted masking bits.

10. The device according to claim 1 further comprising a microcomputer coupled to said registers.

* * * * *